US005331520A

United States Patent [19]

Cejnek

[11] Patent Number: 5,331,520

[45] Date of Patent: Jul. 19, 1994

[54] HEADLIGHTS FOR MOTOR VEHICLES

[75] Inventor: Milan Cejnek, Novy Jicin, Czechoslovakia

[73] Assignee: Autopal s.r.o., Novy Jicin, Czechoslovakia

[21] Appl. No.: 64,864

[22] Filed: May 24, 1993

[30] Foreign Application Priority Data

May 28, 1992 [CS] Czechoslovakia ............ PV 1616-92

[51] Int. Cl.[5] ............................................. B60Q 1/16

[52] U.S. Cl. ...................................... 362/61; 362/308; 362/328; 362/351

[58] Field of Search ............... 362/351, 328, 329, 308, 362/61

[56] References Cited

FOREIGN PATENT DOCUMENTS 0149570 7/1985 European Pat. Off. ............ 362/351

2145214 8/1984 United Kingdom .

*Primary Examiner*—James C. Yeung

*Assistant Examiner*—Sara Sachie Raab

*Attorney, Agent, or Firm*—Beveridge, DeGrandi, Weilacher & Young

[57] ABSTRACT

A headlight for motor vehicles includes a reflector, a light source, a screen and a lens. The screen includes a screen edge which has two stepped portions. A distance $y_1$ between a part of the screen edge on a side of the less distant road edge and a central part of the screen edge is in a range defined as follows:

$$y_1 = (0.005 \text{ to } 0.026) \times (x_F + d/3)$$

wherein $x_F$ is the distance between the screen and the lens, and d is the thickness of the lens. A distance $Y_2$ between the central part of the screen edge and a part of the screen edge on a side of the more distant road edge is such that the total distance $y_1 + Y_2$ is in a range defined as follows:

$$y_1 + Y_2 = (0.008 \text{ to } 0.044) \times (x_F + d/3).$$

The headlights according to the invention have improved luminous intensity of the dipped beam on the side of the road of the nearer road edge.

11 Claims, 2 Drawing Sheets

HEADLIGHTS FOR MOTOR VEHICLES

BACKGROUND OF THE INVENTION

The invention relates to a headlight, preferably for motor vehicles, with improved luminous intensity of the dipped beam on the side of the road of the nearer road edge.

DESCRIPTION OF THE PRIOR ART

The dipped beam of the usual headlight of European design has an asymmetrical 15 degree wedge lifted above the horizontal line that intensifies the lighting and improves the optical orientation of the driver. The dipped beam of American headlights is cut approximately horizontally in the horizontal line or below it on the side nearer to the road edge, which decreases the visibility distance and the safe vehicle speed.

SUMMARY OF THE INVENTION

The headlight according to the invention is of a projection design. The headlight includes a reflector, light source, aperture and lens that acts as an objective which depicts the contrast of the dark area of the aperture on the light background of the reflector and thereby creates the dipped beam of light. The aperture has a cutting edge graduated in two segments below the horizontal line of the headlight. In this manner, a boundary between the light and dark is formed that is below the horizontal line on the side more distant to the road edge and above the horizontal line on the side nearer to the road edge. Thereby, the luminous efficiency of the headlight, the size of the illuminated space around the nearer road edge, and also the visibility distance are increased. These factors increase the safe vehicle speed and improve the optical guidance in the drive using headlights in accordance with the invention.

BRIEF DESCRIPTION OF THE DRAWINGS

The principle of the invention is explained in greater detail in the accompanied drawings wherein.

DETAILED DESCRIPTION OF THE INVENTION

Figure 1:
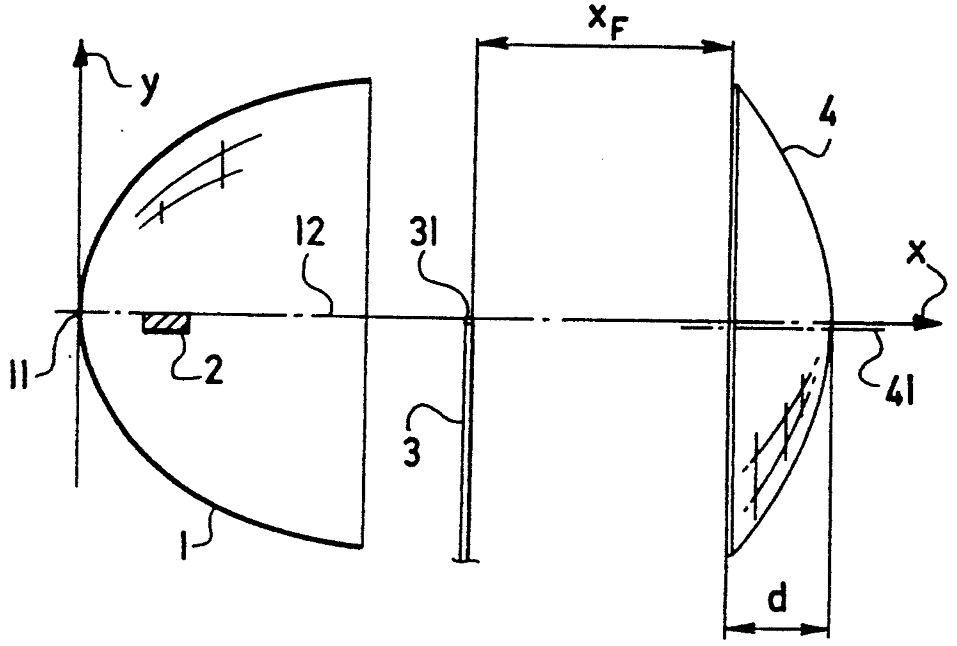
FIG. 1 shows a headlight in vertical section.

FIG. 1 shows a headlight comprised of a reflector 1, a light source 2 situated below the reflector axis 12 of the reflector 1, a screen 3 with a screen edge 31 below the reflector axis 12 of the reflector 1, and a lens 4 having a lens axis 41 also situated below the reflector axis 12 of the reflector 1. This shift between the reflector axis 12, screen edge 31 and lens axis 41 makes it possible to increase the illumination intensity of the headlight, because this design decreases the part of the light beam absorbed by the screen 3. The lens 4 of thickness d is placed at the distance $x_F$ from the screen 3.

Figure 2:
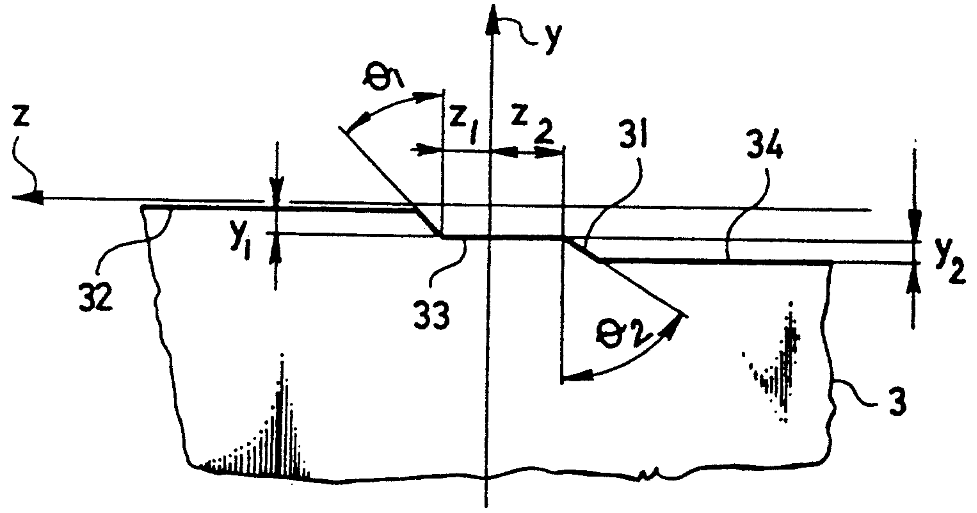
FIG. 2 shows the headlight aperture frontal view.

FIG. 2 shows the screen 3 with the twice stepped screen edge 31 in a view against the light direction. The vertical distance $y_1$ between the part 32 of the screen edge 31 of the screen 3 on the side of the less distant road edge 51 and the central part 33 of the screen edge 31, corresponds to the following relationship:

$$y_1=(0.005 \text{ to } 0.026)\times(x_F+d/3) \quad (1)$$

The vertical distance $y_2$ between the central part 33 of the screen edge 31 and the part 34 of the screen edge 31 on the side of the more distant road edge 53 is such that the total distance $y_1+y_2$ between the external parts 32 and 34 of the screen edge 31 of the screen 3 corresponds to the following relationship:

$$y_1+y_2=(0.008 \text{ to } 0{,}044)\times(x_F+d/3) \quad (2)$$

The distance $z_1$ between the step of the central part 33 of the screen edge 31 of the screen 3 and the vertical line y of the headlight, on the less distant road edge 51 side, corresponds to the following relationship:

$$z_1=(0 \text{ to } 0.44)\times(x_F+d/3) \quad (3)$$

The width $z_1+z_2$ of the central part 33 of the screen edge 31 of the screen 3 corresponds to the following relationship:

$$z_1+z_2=(0.035 \text{ to } 0.122)\times(x_F+d/3) \quad (4)$$

The angle $\Theta_1$ of the step portion between the part 32 of the screen edge 31 of the screen 3 on the less distant road edge 51 side and the central part 33 of the screen edge 31 of the screen 3 is in the range of:

$$\Theta_1=0 \text{ to } 60^\circ \quad (5)$$

The angle $\Theta_2$ of the step portion between the central part 33 and the part 34 of the screen edge 31 on the more distant road edge 53 side of the screen edge 31 of the screen 3 is in the range of:

$$\Theta_2=0 \text{ to } 75^\circ$$

Figure 3:
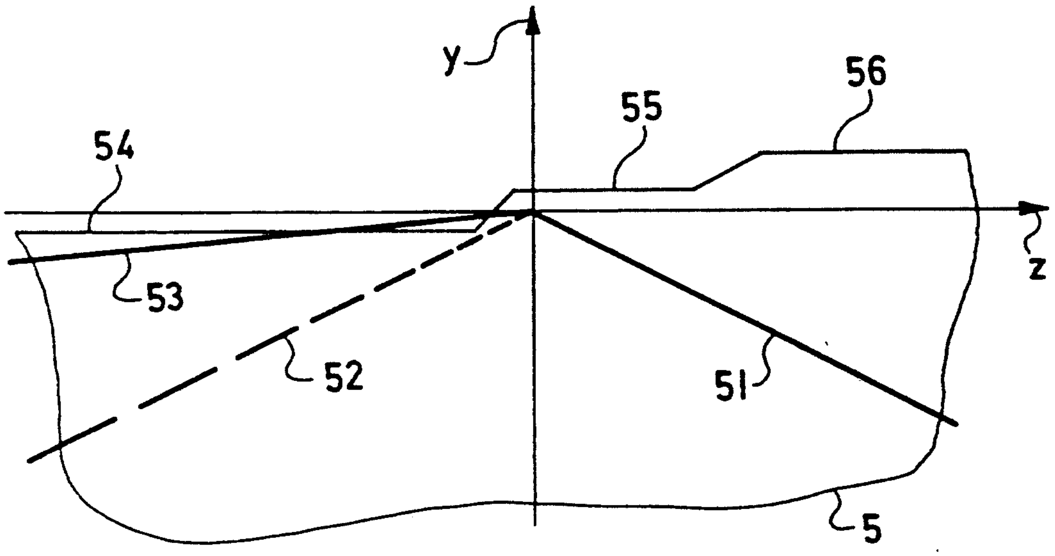
FIG. 3 shows a projection of the light beam according to the invention in the perspective road projection.

FIG. 3 shows a road in perspective. The road includes the less distant road edge 51, the central line 52 and the more distant road edge 53. This Figure shows the projection 5 of the dipped beam of a headlight according to the invention. The boundary 54 between the dark and the illuminated areas on the more distant road edge 53 side is under the horizontal line z of the headlight. In the central part 55, this boundary is stepwise lifted upward. On the less distant road edge 51 side, this boundary 56 is again stepwise lifted upward above the horizontal line z of the headlight. The angles $\Theta_1$ and $\Theta_2$ of the steps are selected according to the required dipped light beam range and the required color correction.

The headlights in accordance with the invention have an increased illumination efficiency, improved illumination of the space in front of the driver on the side less distant to the road edge, which thereby improves the visibility distance and the safe vehicle speed.

I claim:

1. A headlight for motor vehicles, comprising: a reflector, a light source, a screen and a lens, wherein the screen includes a screen edge having two stepped portions, wherein a distance $y_1$ between a part of the screen edge on a side of a less distant road edge and a central part of the screen edge is in a range defined as follows:

$$y_1=(0.005 \text{ to } 0.026)\times(x_F+d/3),$$

and wherein a distance $y_2$ between the central part of the screen edge and a part of the screen edge on a side of a more distant road edge is such that a total distance $y_1+y_2$ is in a range defined as follows:

$$y_1+y_2=(0.008 \text{ to } 0.004)\times(x_F+d/3)$$

wherein:

$x_F$ is a distance between the screen and the lens, and d is a thickness of the lens.

2. A headlight according to claim 1, wherein a distance $z_1$ between an edge of a step of the central part of the screen edge on the less distant road edge side and a center line Y of the headlight is in a range defined as follows:

$$z_1=(0 \text{ to } 0.44)\times(x_F+d/3),$$

and wherein a total width $(z_1+z_2)$ of the central part of the screen edge is in a range defined as follows:

$$z_1+z_2=(0.035 \text{ to } 0.122)\times(x_F+d/3).$$

3. A headlight according to claim 1, wherein an angle $\Theta_1$ of a portion of the screen edge between the part of the screen edge on the less distant road edge side and the central part of the screen edge is in the range of $$\Theta_1=0 \text{ to } 60^\circ$$

and an angle $\Theta_2$ of a portion of the screen edge between the central part and the part of the screen edge on the more distant road edge side is in the range of $$\Theta_2=0 \text{ to } 75^\circ.$$

4. A headlight according to claim 1, wherein the light source is situated below a reflector axis of the reflector.

5. A headlight according to claim 1, wherein a lens axis of the lens is situated below a reflector axis of the reflector.

6. A headlight according to claim 2, wherein an angle $\Theta_1$ of a portion of the screen edge between the part of the screen edge on the less distant road edge side and the central part of the screen edge is in the range of $$\Theta_1=0 \text{ to } 60^\circ$$

and an angle $\Theta_2$ of a portion of the screen edge between the central part and the part of the screen edge on the more distant road edge side is in the range of $$\Theta_2= \text{ to } 75^\circ.$$

7. A headlight according to claim 2, wherein the light source is situated below a reflector axis of the reflector.

8. A headlight according to claim 3, wherein the light source is situated below a reflector axis of the reflector.

9. A headlight according to claim 2, wherein a lens axis of the lens is situated below a reflector axis of the reflector.

10. A headlight according to claim 3, wherein a lens axis of the lens is situated below a reflector axis of the reflector.

11. A headlight according to claim 4, wherein a lens axis of the lens is situated below the reflector axis of the reflector.

* * * * *